United States Patent
Hirota et al.

(10) Patent No.: US 9,660,307 B2
(45) Date of Patent: May 23, 2017

(54) BATTERY TEMPERATURE ADJUSTMENT DEVICE

(75) Inventors: Yasuki Hirota, Seto (JP); Shuji Tomura, Nagoya (JP); Takaji Umeno, Nisshin (JP); Takashi Shimazu, Nagoya (JP); Takashi Murata, Kasugai (JP)

(73) Assignees: KABUSHIKI KAISHA TOYOTA CHUO KENKYUSHO, Nagakute (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 673 days.

(21) Appl. No.: 13/696,402

(22) PCT Filed: May 12, 2011

(86) PCT No.: PCT/JP2011/060974
§ 371 (c)(1),
(2), (4) Date: Nov. 6, 2012

(87) PCT Pub. No.: WO2011/142431
PCT Pub. Date: Nov. 17, 2011

(65) Prior Publication Data
US 2013/0059191 A1    Mar. 7, 2013

(30) Foreign Application Priority Data
May 14, 2010    (JP) ................. 2010-111871

(51) Int. Cl.
*H01M 10/613*    (2014.01)
*H01M 10/615*    (2014.01)
(Continued)

(52) U.S. Cl.
CPC ......... *H01M 10/613* (2015.04); *H01M 2/024* (2013.01); *H01M 10/615* (2015.04);
(Continued)

(58) Field of Classification Search
None
See application file for complete search history.

(56) References Cited

U.S. PATENT DOCUMENTS

| | | | |
|---|---|---|---|
| 2009/0220850 A1* | 9/2009 | Bitsche et al. | 429/50 |
| 2010/0070092 A1* | 3/2010 | Winter et al. | 700/278 |
| 2011/0020676 A1 | 1/2011 | Kurosawa | |

FOREIGN PATENT DOCUMENTS

| | | |
|---|---|---|
| CN | 2567527 Y | 8/2003 |
| CN | 101533932 A | 9/2009 |

(Continued)

OTHER PUBLICATIONS

Aug. 26, 2014 Office Action issued in Chinese Application No. 2011800240847 (with translation).
International Search Report issued in Application No. PCT/JP2011/060974; Dated Aug. 9, 2011 (With Translation).
Apr. 8, 2016 extended European Search Report issued in EP 11780688.5.

*Primary Examiner* — Patrick Ryan
*Assistant Examiner* — Carmen Lyles-Irving
(74) *Attorney, Agent, or Firm* — Oliff PLC

(57) ABSTRACT

A structure for effectively heating a battery. A battery is housed in a battery container. A condenser is formed such that a heating medium is in direct contact with a surface of the battery container, and condenses the heating medium to heat the battery via the battery container. The heating medium condensed by the condenser is supplied to an evaporator that heats and vaporizes the heating medium. The heating medium vaporized by the evaporator which is in vapor is circulated to the condenser.

7 Claims, 10 Drawing Sheets

(51) Int. Cl.
    *H01M 10/6569*     (2014.01)
    *H01M 2/02*     (2006.01)
    *H01M 10/6556*     (2014.01)
    *H01M 10/633*     (2014.01)
    *H01M 10/625*     (2014.01)
    *H01M 10/63*     (2014.01)
    *H01M 10/0525*     (2010.01)

(52) U.S. Cl.
    CPC ... *H01M 10/6556* (2015.04); *H01M 10/6569* (2015.04); *H01M 10/0525* (2013.01); *H01M 10/625* (2015.04); *H01M 10/63* (2015.04); *H01M 10/633* (2015.04); *Y02T 10/7011* (2013.01)

(56) References Cited

FOREIGN PATENT DOCUMENTS

| | | |
|---|---|---|
| JP | A-2003-287328 | 10/2003 |
| JP | A-2004-293872 | 10/2004 |
| JP | A-2008-230508 | 10/2008 |
| JP | A-2008-290636 | 12/2008 |
| JP | A-2008-305575 | 12/2008 |
| JP | 2009-037934 A | 2/2009 |
| JP | A-2009-259454 | 11/2009 |
| JP | A-2009-259785 | 11/2009 |
| JP | A-2010-050000 | 3/2010 |
| WO | 2009/046269 A2 | 4/2009 |

\* cited by examiner

FIG. 7 HEAT-UP MODE

BATTERY TEMPERATURE ADJUSTMENT DEVICE

TECHNICAL FIELD

The present invention relates to a battery heating device for heating a battery by means of heat of condensation of a heating medium.

BACKGROUND ART

A mobile body such as a vehicle having a battery mounted therein uses energy supplied from the battery for driving the vehicle or for other purposes. The energy output efficiency or other factors of the battery are affected by temperature. In particular, at low temperatures, because the viscosity of a liquid electrolyte within the battery or reaction resistance is increased, sufficient power cannot be obtained, and, on the other hand, if the temperature is too high, battery constituent materials may be adversely affected. Therefore, management of the temperature of the battery is important.

Patent Document 1 describes a structure provided with a heat exchanger for circulating a heating medium to be circulated in a water-cooled engine, in which this heat exchanger is used to warm up a battery. Further, Patent Document 2 discloses that a battery is heated by heat (Joule heat) generated in electric wire for driving a motor using power supplied from a generator.

PRIOR ART DOCUMENTS

Patent Documents

Patent Document 1: JP 2008-290636 A
Patent Document 2: JP 2008-230508 A
Patent Document 3: JP 2008-305575 A

SUMMARY OF THE INVENTION

Problems to be Solved by the Invention

Because the performance of a battery at low temperatures is significantly low, there is a demand that the battery be heated as quickly as possible. When heat generated in wire is used, the energy will be correspondingly wasted. Further, in a conventional heat exchanger, it has been difficult to add heat quickly.

Further, as a too high temperature may adversely affect battery constituent materials, Patent Document 3 discloses a structure wherein water vapor obtained by a condensation evaporator is fed to an adsorber during cold startup, thermal energy is provided to the adsorber by heat of condensation, and a battery pack is heated using heat exchanging fluid by means of heat coming from the adsorber.

Means for Solving the Problems

According to one aspect of the present invention, there is provided a battery temperature adjustment device comprising a battery container for housing a battery; a condenser for condensing a heating medium to heat the battery container by heat transfer, the condenser being formed such that the heating medium is in direct or indirect contact with a surface of the battery container; and an evaporator for heating and vaporizing the heating medium condensed by the condenser, wherein the heating medium vaporized by the evaporator which is in vapor is circulated to the condenser.

Further, according to another aspect of the present invention, there is provided a battery temperature adjustment device comprising a battery container for housing a battery; a heat exchanger for vaporizing a heating medium to cool the battery via the battery container by heat transfer, the heat exchanger being connected to the battery container; and a condenser for cooling and condensing the heating medium vaporized by the heat exchanger, wherein the heating medium condensed by the condenser which is in liquid is vaporized by the heat exchanger.

Further, according to still another aspect of the present invention, there is provided a battery temperature adjustment device comprising a battery container for housing a battery; a heat exchanger for vaporizing or condensing a heating medium to cool or heat the battery via the battery container by heat transfer, the heat exchanger being connected to the battery container; an adsorber for adsorbing the heating medium vaporized by the heat exchanger; and a condenser/evaporator for either cooling and condensing vapor of the heating medium desorbed from the adsorber, or vaporizing the heating medium condensed by the heat exchanger which is in liquid.

Advantages of the Invention

By employing the present invention, it is possible to effectively heat a battery using heat of condensation of a heating medium. Further, it is also possible to effectively cool a battery using heat of vaporization of a heating medium.

EMBODIMENTS FOR CARRYING OUT THE INVENTION

Figure 1:
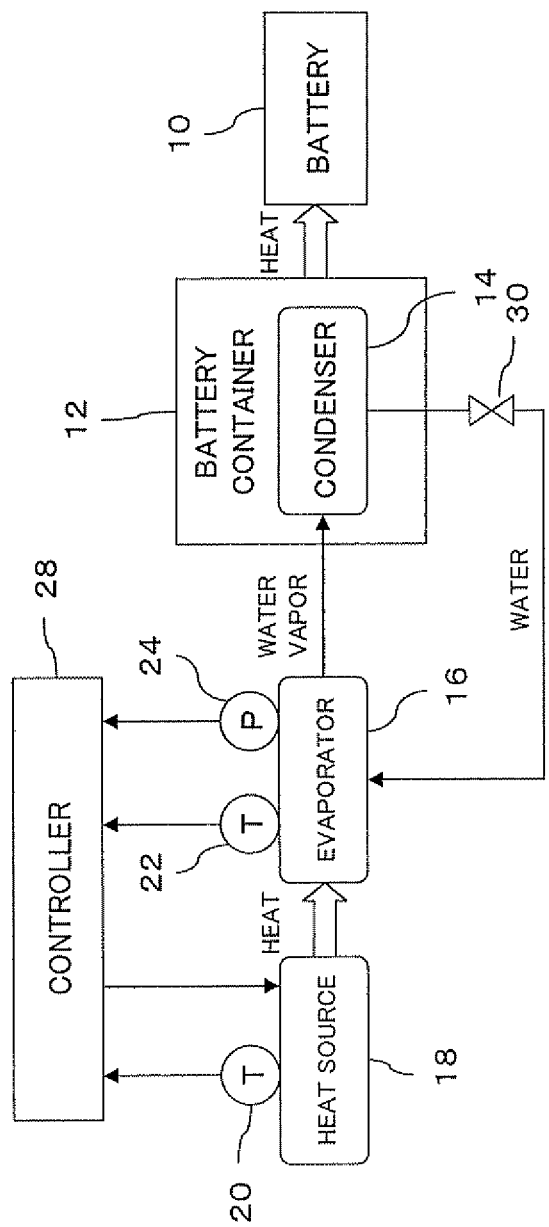
FIG. 1 shows a schematic structure of a battery temperature adjustment device according to an embodiment of the present invention.

FIG. 1 shows a schematic structure of a battery temperature adjustment device according to an embodiment of the present invention. A battery 10 is housed in a battery container 12. A heating medium passage is formed in the battery container 12 near where it houses the battery 10, and this portion constitutes a condenser 14. An evaporator 16 is connected to the condenser 14, and a heating medium circulates between them. Further, a heat source 18 is thermally connected to the evaporator 16, and heat coming from the heat source 18 is used to vaporize the heating medium in the evaporator 16.

The heat source 18 is provided with a thermometer 20, the evaporator 16 is provided with a thermometer 22 and a pressure gage 24, and their detection results are supplied to a controller 28. The controller 28 controls the heat source 18 to regulate the temperature and the pressure of the heat source 18 and the evaporator 16. Further, in this example, a valve 30 is provided in a channel through which a heating medium is returned from the condenser 14 to the evaporator 16.

The battery 10 is a secondary battery, and, for example, a lithium ion battery is used. In lithium ion batteries, in particular, the liquid electrolyte has a high viscosity, the internal resistance is high at low temperatures, and the power input and output characteristics are significantly deteriorated at low temperatures. As such, when the temperature is low, it is necessary to add heat rapidly to obtain sufficient capability. It should be noted that the battery 10 is composed of a plurality of battery cells, and is, for example, a battery pack in which a plurality of battery cells each having a voltage of about several volts are serially connected to each other to obtain power of several hundred volts.

The battery container 12 has, for example, a number of housing holes corresponding to the number of the battery cells, each housing hole housing one battery cell. It should be noted that the battery cells are electrically connected to each other, and, when viewed as a battery pack, have an external output terminal to which a cable is connected, and are collectively insulated.

Figure 2:
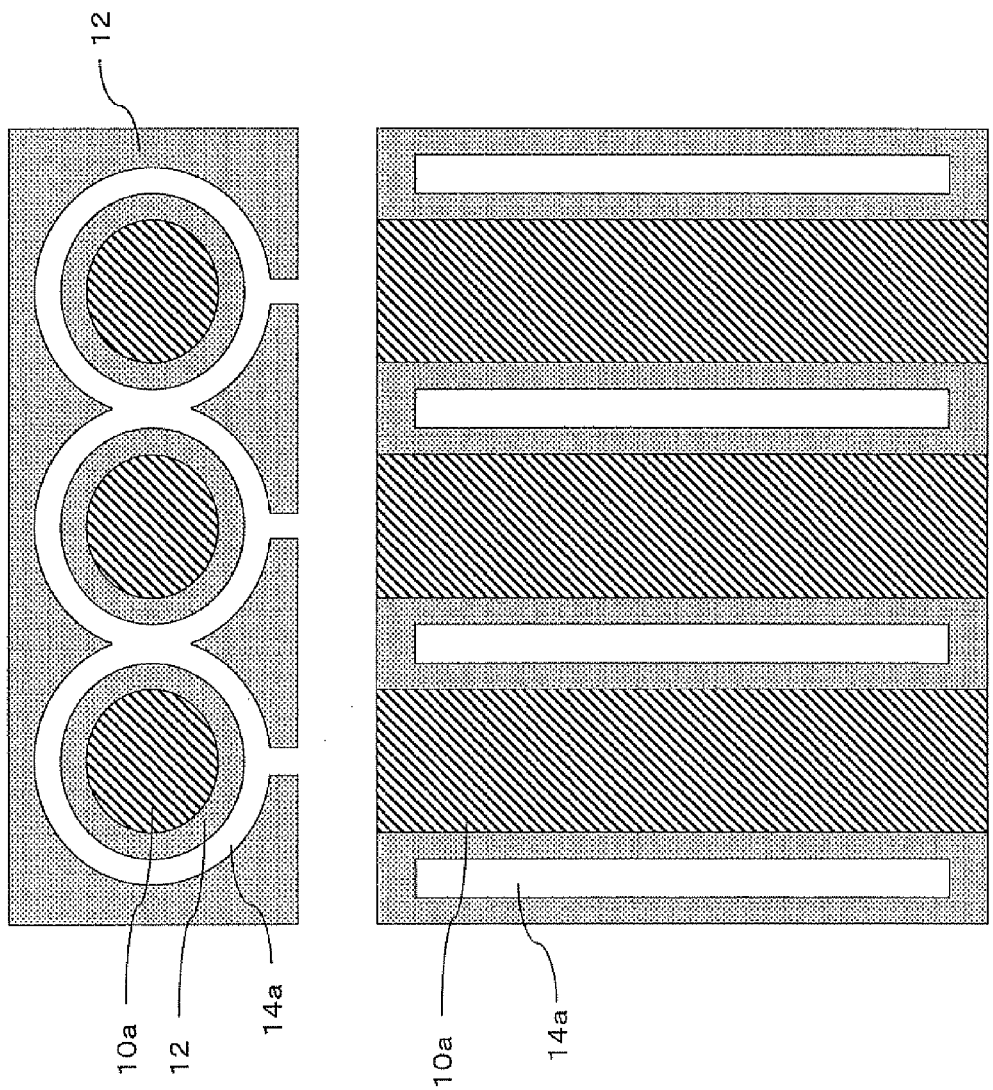
FIG. 2 shows an example structure of a battery container.

FIG. 2 shows an example structure of the battery container 12. The battery container 12 as a whole is a rectangular parallelepiped, through which a plurality of housing holes are provided at regular intervals. A battery cell 10a is inserted into one of the housing holes. In this example, the battery cell 10a is contained in a cylindrical package, and the periphery of this package is in contact with the housing hole. To improve heat conduction, it is preferable that the contact be made over as large an area as possible, and it is also suitable that a material having an excellent thermal conductivity, such as an epoxy resin, is filled in a space between an inner surface of the housing hole and the peripheral surface of the battery cell 10a.

A toroidal space 14a is provided around the battery cell 10a, and this space constitutes the condenser 14. Specifically, vapor (in this example, water vapor) of a heating medium coming from the evaporator 16 is introduced into the space 14a, and heat of condensation generated at that time causes the battery cell 10a to be heated via the battery container 12, and causes the battery 10 to be heated. The battery container 12 is preferably formed of a thermally conductive metal, but can also be formed of plastic. Further, as shown in FIG. 2, portions other than the housing holes and the spaces 14a are preferably solid, but may be formed to be hollow using a flat material. It should be noted that the spaces 14a are each a passage for a heating medium.

Specifically, the inside of the condenser 14 and the evaporator 16, together with pipes connecting therebetween, forms an enclosed space in which a heating medium (in this example, water or water vapor) is circulated. Water vapor vaporized in the evaporator 16 is cooled by the battery 10 in the condenser 14, and turns into a liquid (water), and then, water which has been turned into a liquid state is circulated to the evaporator 16.

The evaporator 16 vaporizes water by means of heat coming from the heat source 18. As an evaporator, a structure of a typical heat exchanger can be used, and the evaporator causes heat coming from a heat source to act on a heating medium flowing in a heating medium channel to heat and vaporize the heating medium.

As the heat source 18, various types of structures can be used, and, for example, an electric air conditioner mounted in a vehicle may be used. An electric air conditioner includes a heat pump having a condenser and an evaporator, pressurizes a heating medium by means of a compressor, and supplies it to the condenser, in which, by closing a discharge side of the condenser to achieve a high pressure therein, the condenser can be heated to a high temperature. Then, the heat of the condenser can be transferred to the evaporator 16. The heat source 18 is not limited to this example, but a vehicle-mounted heat generation source such as an engine or a radiator can be used, or a dedicated heater may be provided.

The controller controls heat coming from the heat source 18 in accordance with the temperature and the pressure of the heating medium in the inside of the evaporator 16 to control the temperature and the pressure of the heating medium in the evaporator 16. For example, while the inside of the evaporator 16 is kept in a substantially vacuum state at a pressure at which, when the heating medium is vaporized, the boiling point of the heating medium is 55° C., heating is controlled such that the temperature of vapor of the heating medium is 55° C. As a result, the heating medium vaporizes in the evaporator 16, and condenses in the condenser 14 while the temperature is kept at 55° C., and the heating medium of 55° C. returns to the evaporator 16 to control the amount of heat coming from the heat source 18. As a result, the battery 10 can be heated by condensing vapor in the condenser 14. Practically, it is preferable that the temperature of vapor to be supplied to the condenser 14 is set to be rather somewhat higher than the boiling point, and the temperature of the heating medium to be returned is set to be rather lower than the boiling point so that the cycle is stabilized.

A hybrid electric vehicle has a secondary battery mounted therein, in which the secondary battery is used to drive a motor generator, and power generated by the motor generator or regenerative power are used to charge the secondary battery. Further, although a secondary battery in an electric vehicle is charged by externally supplied power rather than power generated by a motor generator, electric vehicles are similar to hybrid electric vehicles in that a secondary battery mounted in a vehicle is charged and discharged. As the battery 10 mounted in such a vehicle, for example, a lithium ion secondary battery is used. The lithium ion secondary battery has a high electrolyte viscosity at low temperatures, and has a high internal resistance at low temperatures. In the present embodiment, by adding heat using vapor, it is possible to quickly lower the internal resistance to drive the motor at low temperatures making full use of the capacity of the battery. Further, when the battery has a low temperature and a high internal resistance, an attempt to store all regenerative energy in the battery 10 will increase overvoltage within the battery 10 to cause precipitation of metal lithium, which tends to result in deterioration of the capabilities of the battery. Therefore, it is necessary to increase the temperature of the battery 10 quickly.

On the other hand, it is reported that, when the lithium ion secondary battery gets hot, it will deteriorate because a side reaction different from the battery reaction occurs within the battery. Therefore, when the battery is heated by increasing the temperature of a heat exchanger which is provided for heating the battery, monitoring or other means for preventing the temperature of the battery from reaching or exceeding a predetermined level is required. In the present embodiment, because heating is performed by condensing vapor in the condenser 14 while the pressure of the vapor is being maintained at a predetermined value, the temperature of the condenser 14 is maintained at the condensation temperature of the heating medium, and can be prevented from exceeding that level. Therefore, it is possible to reliably prevent the battery 10 from reaching or exceeding a predetermined temperature.

An example in which an electric air conditioner as described above is used as the heat source 18 will be described below. A lead acid battery (2 kW) having good output characteristics is used as a power source for the electric air conditioner. Heat is generated by driving an inverter air conditioner in a heat-up mode. As a result, as the heat, in theory, heat of about 7° C., 14 kW, can be generated.

Figure 3:
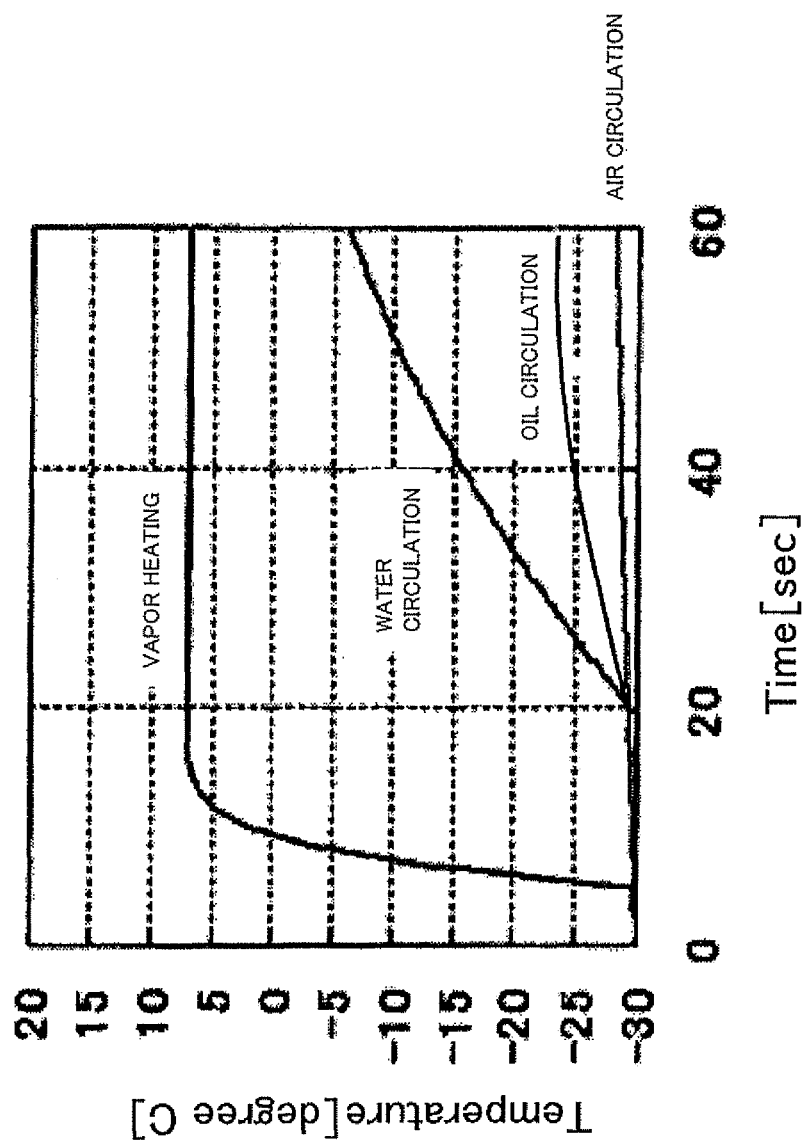
FIG. 3 shows heating characteristics produced by various types of heating media.

For cases where heating is performed by convection heat transfer by means of vapor, water, oil, or air using the heat source 18 as described above, results of simulation of heating (temperature increase results) are shown in FIG. 3. In this simulation, it is also assumed that there are delays in the air conditioner. As such, a delay occurs even when any heating medium is used. However, the results show that vacuum vapor heating according to the present embodiment allows the quickest start-up, and also allows fast temperature increase. This is because the heat capacity for heating the heating medium is incomparably small and the coefficient of heat transfer is high in vacuum vapor heating, as compared with cases where water or oil is circulated. This simulation assumes that water will not freeze. Further, air does not allow sufficient temperature increase as it has a low coefficient of heat transfer.

Figure 4:
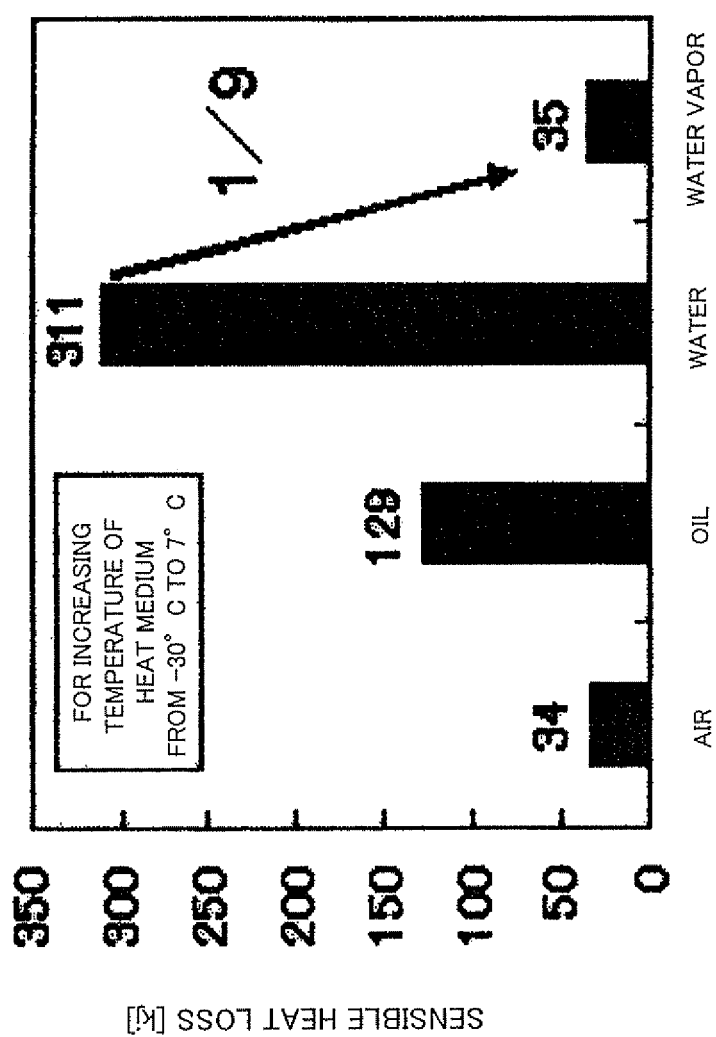
FIG. 4 shows sensible heat losses of various types of heating media.

FIG. 4 shows sensible heat losses for cases where heating is performed using the respective media from −30° C. to 7° C. As shown, it should be understood that a medium having a large heat capacity such as oil or water exhibits a high sensible heat loss, and causes a delay in temperature increase. The sensible heat loss of water vapor is about ⅙ that of water, and is approximately the same as that of air. It should be noted that this example also assumes that water is in the form of liquid.

Figure 5:
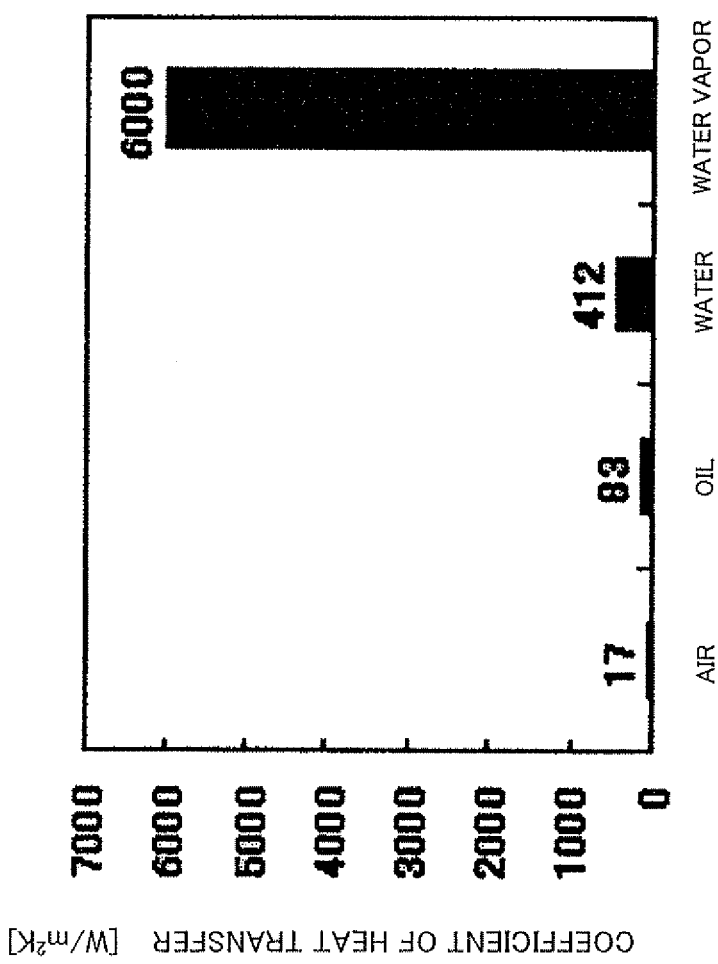
FIG. 5 shows coefficients of heat transfer of various types of heating media.

FIG. 5 shows coefficients of heat transfer for cases where heating is performed using the respective media from −30° C. to 7° C. As shown, water vapor has an exceptionally high coefficient of heat transfer, which is about 15 times that of water and 300 times that of air.

It can be understood from these results that, when water vapor is used as the medium, a small sensible heat loss and a high heat transfer capability can be expected.

In the present embodiment, for example, by setting the temperature of vapor in the condenser (evaporation and condensation temperature) to 7° C., under extremely cold temperature of as low as −30° C., it is possible to increase the temperature up to 7° C. in approximately one minute.

In this process, it is necessary to return liquid formed in the condenser 14 to the evaporator 16. Although liquid is circulated smoothly after the circulation cycle of the heating medium starts operating, for example, during startup, it is necessary to forcedly return liquid to the evaporator 16. For this purpose, it is preferable that the condenser 14 be located at a higher position than the evaporator 16 so that, when the operation ends, all liquid is returned to the evaporator 16. It should be noted that liquid may be returned by other means such as a pump.

Further, although water is used as the heating medium, the present invention is not limited to this embodiment. Any other substance which allows efficient use of evaporation latent heat may be used. For example, a substance having a large evaporation latent heat such as ammonia, methanol, or ethanol is preferable, and a high coefficient of heat transfer can be provided. Further, when ammonia or carbon dioxide is used, as it has a high vapor density, loss does not tend to occur in a pipe or elsewhere; this structure is particularly preferable when the pipe is long.

"Cooling and Heating System"

Figure 6:
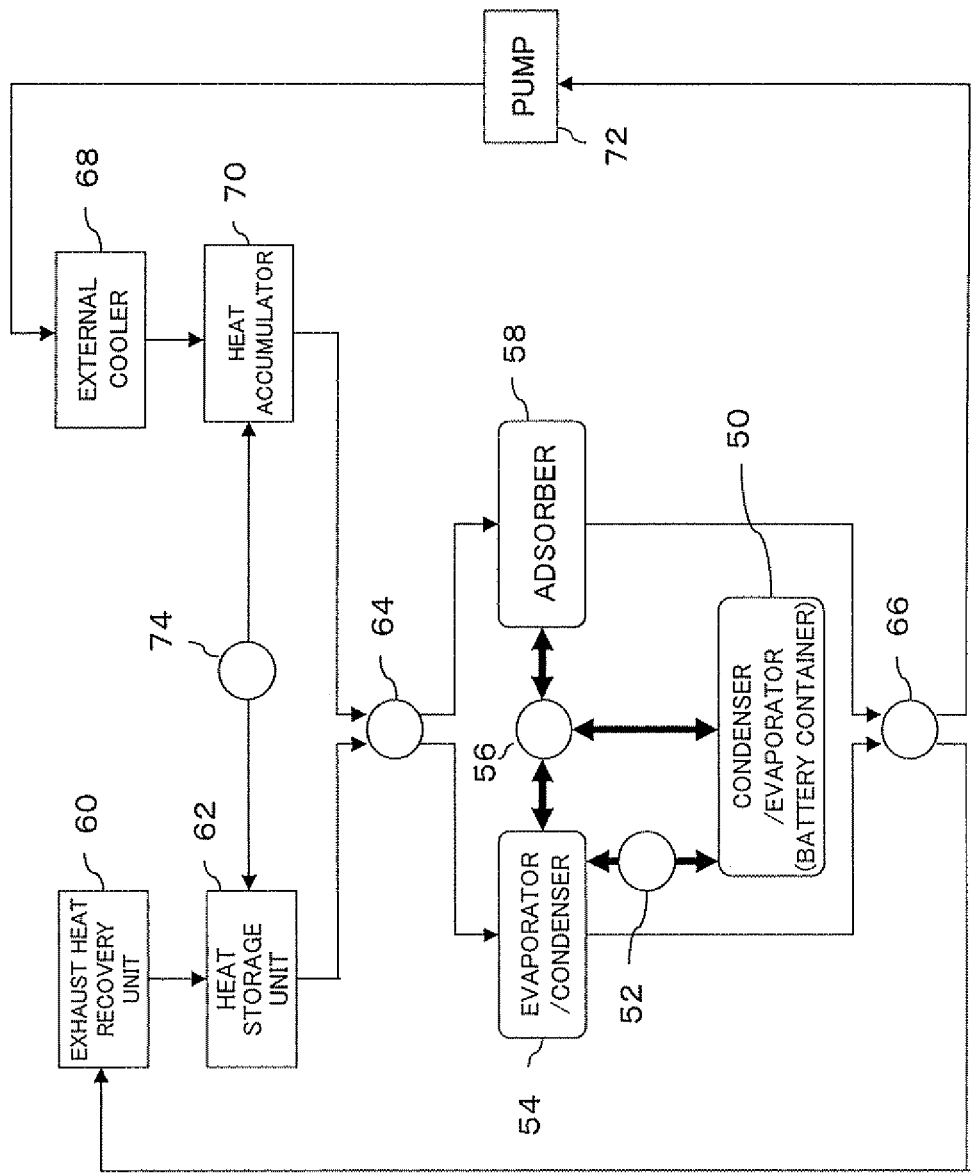
FIG. 6 shows a structure of a cooling and heating system.

FIG. 6 shows a system in which a space in the battery container 12 is not used only as a condenser but also as a condenser/evaporator 50, and the evaporator 16 is used as a evaporator/condenser 54. It should be noted that it is a typical method to cause an evaporator and a condenser in a heat pump to respectively function in the opposite manner, and the present embodiment also employs this method.

The condenser/evaporator 50 has a structure similar to that of the above-described condenser 14, and is formed as an inner space through which a heating medium circulates within the battery container 12 which houses the battery 10. When vapor is introduced into this space and is condensed into liquid, the condenser/evaporator 50 functions as a condenser, and, when a liquid heating medium is introduced and vaporized, the condenser/evaporator 50 functions as an evaporator.

The evaporator/condenser 54 is connected to the condenser/evaporator 50 via a valve 52. The evaporator/condenser 54 has a structure similar to that of the above-described evaporator 16. When a liquid heating medium is supplied, the evaporator/condenser 54 heats and vaporizes it, and functions as an evaporator, and, when vapor is introduced, the evaporator/condenser 54 performs heat dissipation and condensation, and functions as a condenser. The condenser/evaporator 50 is connected to the evaporator/condenser 54 via a three-way valve 56. Therefore, the temperature of the battery 10 can be increased by vaporizing a heating medium in the evaporator/condenser 54, introducing the resultant vapor into the condenser/evaporator 50, condensing the vapor there, and circulating it in the form of liquid to the evaporator/condenser 54.

Further, in the present embodiment, an adsorber 58 is connected via the three-way valve 56. This adsorber adsorbs vapor formed in the condenser/evaporator 50 while the battery is cooled, and later, desorbs the adsorbed vapor, and, for example, the inside of it is filled with a vapor adsorbent such as silica gel.

Further, in the present embodiment, means for heating or cooling the evaporator/condenser 54 and the adsorber 58 is provided. An exhaust heat recovery unit 60 provided before the engine exhaust gas muffler recovers heat from exhaust gas into a heat medium such as water, which is used in, for example, a vehicle cabin heater; in this example, this water is supplied to a heat storage unit 62 to store heat. For the heat storage unit 62, anything capable of storing heat may be used. In this example, a chemical heat storage unit is used. For example, calcium is used, and heat is chemically stored by changing calcium hydroxide $Ca(OH)_2$ into $CaO$ by means of heat. Further, when necessary, water is supplied, and heat is dissipated by changing $CaO$ into $Ca(OH)_2$ so that the heat medium (water) is heated to produce a high-temperature heat medium (hot water). The hot water produced in the heat storage unit 62 is supplied to the evaporator/condenser 54 or the adsorber 58 via a four-way valve 64. Further, the medium coming from the evaporator/condenser 54 or the adsorber 58 is circulated to the exhaust heat recovery unit 60 via a four-way valve 66.

Further, a low-temperature coolant (cooling water) coming from an external cooler 68 is stored in a heat accumulator 70. The external cooler 68 is composed of, for example, a radiator which is used for cooling, for example, an engine. For the heat accumulator 70, anything capable of storing heat may be used. In this example, cooling water is simply stored. The cooling water coming from the heat accumulator 70 is supplied to the adsorber 58 or the evaporator/condenser 54 via the four-way valve 64. Further, the medium coming from the adsorber 58 or the evaporator/condenser 54 is circulated to the external cooler 68 via the four-way valve 66 and a pump 72.

As described above, in the present embodiment, a hot water line for which the exhaust heat recovery unit 60 serves as a heat source and a cooling water line for which the external cooler 68 serves as a cooling source are provided separately from a line for the heating medium (water), and the evaporator/condenser 54 and the adsorber 58 can be heated or cooled.

Further, the heat accumulator 70 is connected to the heat storage unit 62 via a valve 74 so that heat from the heat accumulator 70 can be dissipated to the heat storage unit 62.

It should be noted that, although the exhaust heat recovery unit 60 and the heat storage unit 62 are used as examples of a heat source for hot water, heat may also be generated from a combustor or electrical energy. Also, the adsorber 58 may be replaced with a chemical reaction.

"Heat-Up Mode"

Figure 7:
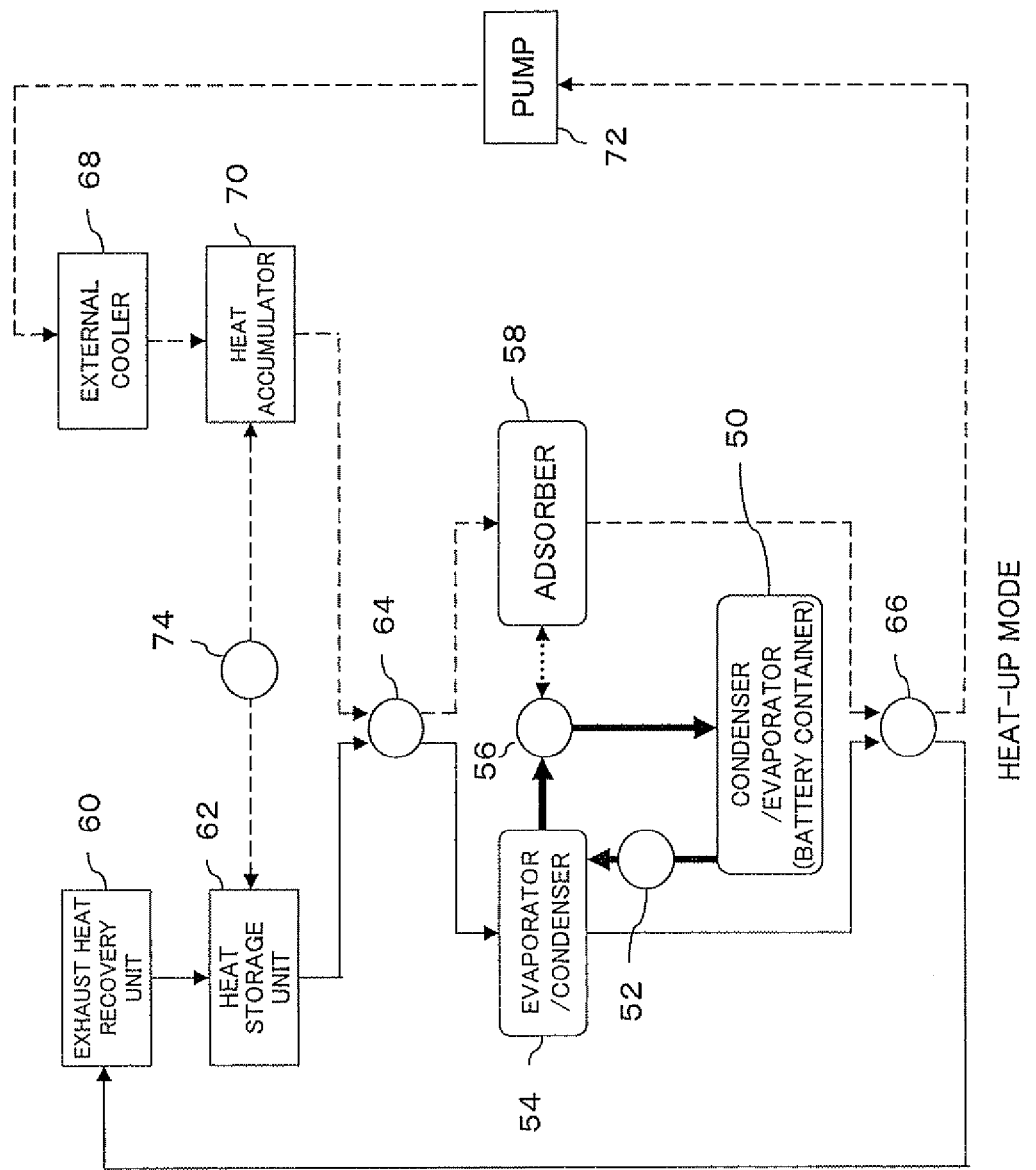
FIG. 7 is a diagram for explaining a heat-up mode.

A heat-up mode in which the temperature of the battery is increased in the above-described system will be described below with reference to FIG. 7. In this case, the evaporator/condenser 54 functions as an evaporator. Therefore, the four-way valve 64 supplies hot water coming from the heat storage unit 62 to the evaporator/condenser 54. The hot water coming from the evaporator/condenser 54 is circulated to the exhaust heat recovery unit 60 via the four-way valve 66.

Therefore, heat recovered by the exhaust heat recovery unit 60 is supplied to the evaporator/condenser 54, and the heating medium is vaporized here. The vaporized heating medium is supplied to the condenser/evaporator 50 via the three-way valve 56, and turns into water here. Further, the resultant water is circulated to the evaporator/condenser 54. The valve 52 is left open. As a result, heat supplied to the evaporator/condenser 54 is supplied to the battery via the battery container 12 in the form of heat of condensation, and the battery 10 is heated. Further, by regulating the temperature and the pressure of the heating medium in the evaporator/condenser 54, it is possible to set the temperature of the battery to a predetermined temperature in a short time.

"Cooling Mode"

Figure 8:
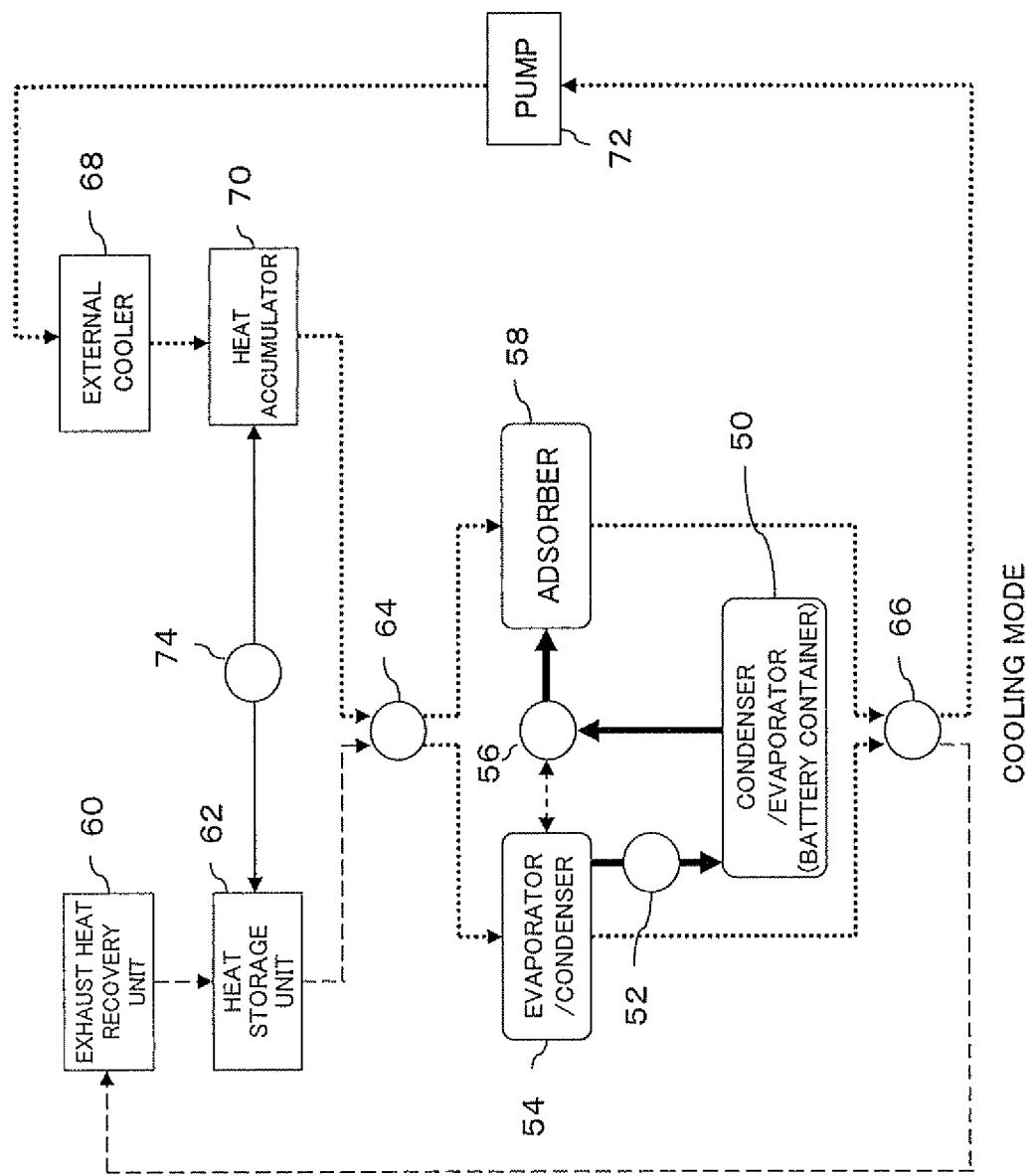
FIG. 8 is a diagram for explaining a cooling mode.

FIG. 8 illustrates a cooling mode. In the cooling mode, the evaporator/condenser 54 is used as a condenser, and a liquid heating medium (water) produced therein is supplied to the condenser/evaporator 50. The valve 52 is left open. The condenser/evaporator 50 vaporizes water to produce water vapor, and the water vapor is introduced into the adsorber 58 via the three-way valve 56. The adsorber 58 has, for example, silica gel, and the silica gel adsorbs vapor. In this process, the surface of the battery container 12 is cooled to a temperature corresponding to the pressure on the adsorber 58 side. Further, the adsorber 58 generates heat corresponding to the amount of vapor adsorbed, and this heat is discharged into cooling water. Further, when the temperature of the cooling water is high and the battery 10 cannot be cooled sufficiently, it is preferable to open the valve 74 located between the heat storage unit 62 and the heat accumulator 70 to cause the heat storage unit 62 to absorb heat to turn the heat accumulator 70 into a heat dissipation mode so that the temperature of the cooling water is lowered and the pressure in the adsorber 58 is reduced.

Further, the cooling water cooled in the external cooler 68 is supplied to the adsorber 58 via the four-way valve 64 to cool the adsorber 58. Therefore, heat generated in the adsorber 58 is removed by the cooling water. Further, the cooling water may also be supplied to the evaporator/condenser 54 to cool the evaporator/condenser 54.

In this process, in the present embodiment, vapor generated in the condenser/evaporator 50 is adsorbed by the adsorber 58, and is not circulated to the evaporator/condenser 54. Therefore, the temperature of vapor in the condenser/evaporator 50 can also be made lower than the temperature of water in the evaporator/condenser 54, and the battery can be cooled effectively.

"Adsorber Regeneration Mode"

Figure 9:
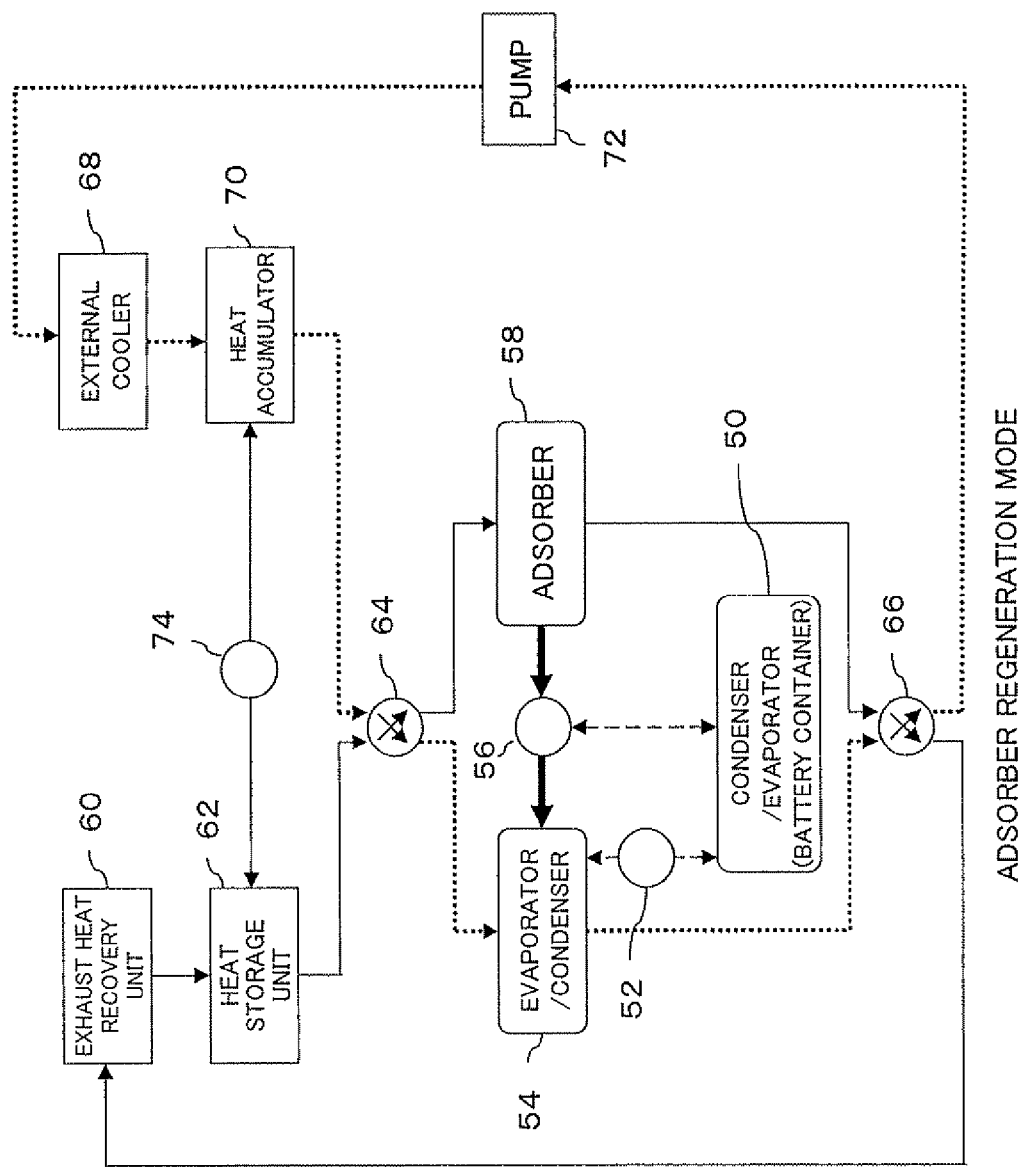
FIG. 9 is a diagram for explaining an adsorber regeneration mode.

FIG. 9 illustrates an adsorber regeneration mode. The hot water coming from the heat storage unit 62 is supplied to the adsorber 58 via the three-way valve. As a result, the adsorber 58 is heated, and the adsorbed heating medium (water) is desorbed in the form of water vapor. The resultant water vapor is introduced into the evaporator/condenser 54 via the three-way valve. In this process, the valve 52 is left closed. The cooling water coming from the heat accumulator 70 is supplied to the evaporator/condenser 54 via the four-way valve 64, and the heating medium (water vapor) turns into a liquid (water) here. Because, as described above, in the adsorber regeneration mode, the heating medium is condensed by cooling the evaporator/condenser 54, it is unnecessary to cool the evaporator/condenser 54 in the cooling mode.

When the battery 10 is to be cooled, the above-described cooling mode is performed at the time when it is necessary, and, after it is completed, the adsorber regeneration mode is performed. Further, by repeating the two modes as needed, the battery 10 is cooled as necessary.

"Battery Cooling"

Figure 10:
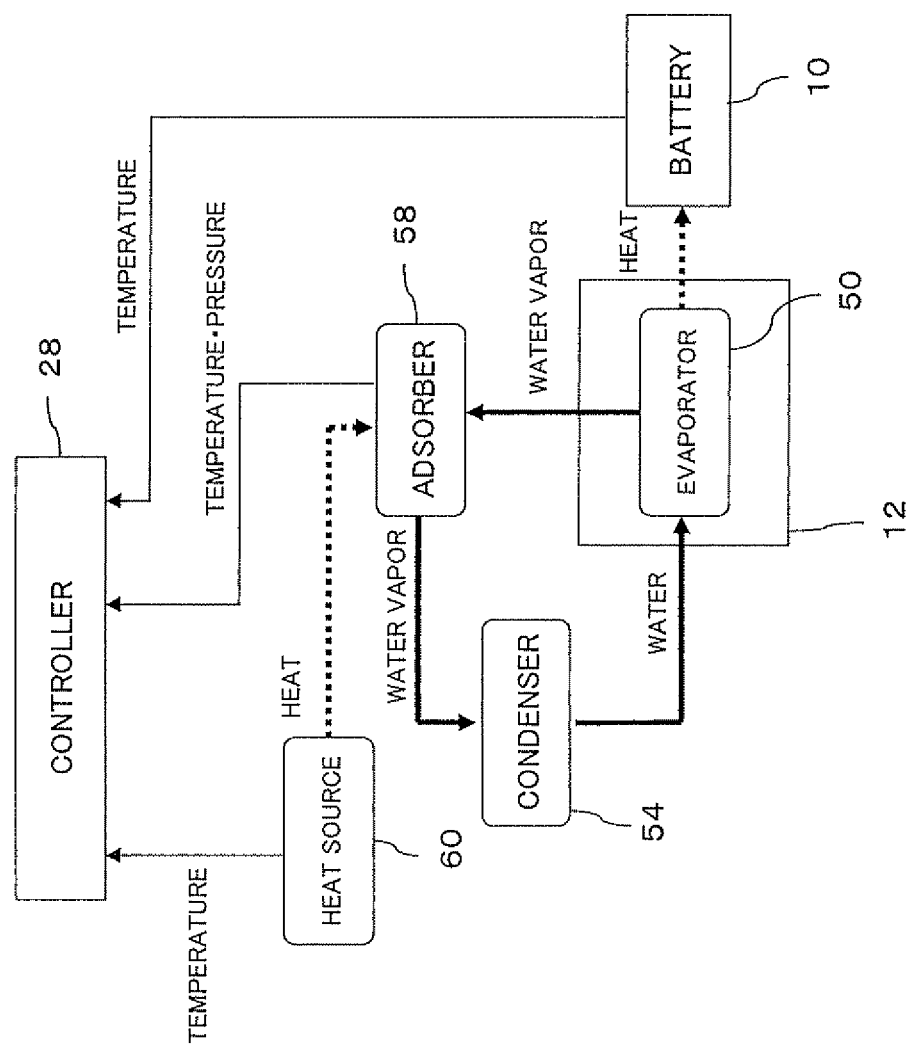
FIG. 10 shows a structure for cooling a battery.

FIG. 10 shows an outline of cooling of the battery 10. In FIG. 10, as it illustrates cooling, the condenser/evaporator 50 is denoted as the evaporator 50, and the evaporator/condenser 54 is denoted as the condenser 54.

Condensed water produced in the condenser 54 is supplied to the evaporator 50. The evaporator 50 is formed as a space into which the heating medium (water) is introduced, within the battery container 12 which houses the battery 10. Therefore, as the condensed water vaporizes in the evaporator 50, the battery 10 is cooled, and the water vapor produced as a result of vaporization is introduced into and adsorbed by the adsorber 58. After the water vapor is temporarily adsorbed by the adsorber 58, heat coming from the heat source (exhaust heat recovery unit) 60 is caused to act on the adsorber 58 so that the water vapor is desorbed from the adsorbent, and the water vapor is introduced into the condenser 54, and is condensed here. The temperature and the pressure of the adsorber 58 are supplied to the controller 28, and the controller 28 determines, based on the temperature of the battery 10, whether or not cooling is necessary, and, when cooling is necessary, calculates an amount of heat of cooling which is required for cooling the battery, based on the temperature of the battery. Then, the adsorber 58 is cooled to lower the pressure therein. After certain cooling is completed, the adsorber 58 is connected with the evaporator 50, and heat coming from the heat source (exhaust heat recovery unit) 60 is supplied to the adsorber. As a result, water vapor is desorbed from the adsorber 58, and the adsorber 58 is regenerated. Further, the water vapor coming from the adsorber 58 is introduced into the condenser 54, and is cooled to turn into water.

As described above, desired cooling of the battery 10 is achieved. If necessary, the above-described cooling and regeneration of the adsorber may be repeated.

As described above, the structure according to the above-described embodiment includes the evaporator 50 serving as a heat exchanger for cooling the battery, and includes an adsorbing type freezer having the adsorber 58 which absorbs or adsorbs a heating medium coming from the evaporator 50. As a result, it is possible to cool the evaporator 50 to a temperature corresponding to the pressure in the adsorber 58 to set it to a temperature lower than the temperature in the condenser 54.

REFERENCE NUMERALS

10 BATTERY
12 BATTERY CONTAINER
14 CONDENSER
16 EVAPORATOR
18 HEAT SOURCE
20, 22 THERMOMETER
24 PRESSURE GAGE
28 CONTROLLER
30 VALVE
50 CONDENSER/EVAPORATOR
54 EVAPORATOR/CONDENSER
56 THREE-WAY VALVE
58 ADSORBER
60 EXHAUST HEAT RECOVERY UNIT
62 HEAT STORAGE UNIT
64, 66 FOUR-WAY VALVE
68 EXTERNAL COOLER
70 HEAT ACCUMULATOR
72 PUMP
74 VALVE

The invention claimed is:

1. A battery temperature adjustment device comprising:
a battery container configured to house a battery;
a condenser configured to condense a heating medium to heat the battery container by heat transfer, the condenser being formed such that the heating medium is in direct or indirect contact with a surface of the battery container;
an evaporator configured to heat and vaporize the heating medium condensed by the condenser; and
a controller programmed to control a temperature and a pressure of the heating medium in the evaporator such that a condensation temperature of the heating medium in the condenser is equal to a heating target temperature of the battery, wherein the heating medium vaporized by the evaporator is in vapor phase and is circulated to the condenser such that the battery is heated through heat of condensation by the heating medium condensing from vapor phase to liquid phase in the condenser.

2. The battery temperature adjustment device according to claim 1, wherein the condenser is formed such that the heating medium is in direct contact with the surface of the battery container.

3. The battery temperature adjustment device according to claim 1, wherein the battery container has a battery housing hole, and the battery is housed in the battery housing hole.

4. The battery temperature adjustment device according to claim 3, wherein the battery housing hole is provided through the battery container.

5. The battery temperature adjustment device according to claim 4, wherein an inner surface of the battery housing hole and an outer surface of the battery are either in direct contact with each other, or in contact with each other via a thermally conductive material.

6. The battery temperature adjustment device according to claim 3, wherein a passage for the heating medium is formed in the battery container such that it surrounds the battery housing hole, and the heating medium is condensed in the passage.

7. The battery temperature adjustment device according to claim 1, wherein the heating medium is water.

* * * * *